A. J. LOTKA.
METHOD AND APPARATUS FOR PREPARING REPRESENTATIONS OR REPRODUCTIONS, ON THE ORIGINAL OR ON AN ALTERED SCALE, OF OBJECTS, IMAGES, OR PICTURES.
APPLICATION FILED SEPT. 8, 1910.

1,176,384.

Patented Mar. 21, 1916.
5 SHEETS—SHEET 1.

Witnesses:
E. C. Crittenden.
Orin Tugman.

Inventor:
Alfred J. Lotka

UNITED STATES PATENT OFFICE.

ALFRED J. LOTKA, OF WASHINGTON, DISTRICT OF COLUMBIA.

METHOD AND APPARATUS FOR PREPARING REPRESENTATIONS OR REPRODUCTIONS, ON THE ORIGINAL OR ON AN ALTERED SCALE, OF OBJECTS, IMAGES, OR PICTURES.

1,176,384.

Specification of Letters Patent. Patented Mar. 21, 1916.

Application filed September 8, 1910. Serial No. 581,012.

*To all whom it may concern:*

Be it known that I, ALFRED J. LOTKA, a citizen of the United States, and a resident of the city of Washington, District of Columbia, have invented a new method and apparatus for preparing representations or reproductions, on the original or on an altered scale, of objects, images, or pictures, of which the following is a specification.

The expression "on an altered scale," as used in this description, and in the appended claims must be understood in a broad general sense, to include not only those types of representations or reproductions commonly spoken of as "enlargements" or "reduced copies," but any representation or reproduction of a given original, such that the several dimensions (that is to say the several lengths, areas and angles) of the several parts of the representation or reproduction differ in whole or in part from the corresponding dimensions of the related parts of the original. Thus, if all lengths of the reproduction are some fixed multiple of the corresponding lengths of the original, while all angles are unaltered, such a reproduction is what is commonly called an "enlargement." My invention contemplates however also for example the preparation of a representation or reproduction, such that all lengths measured in a certain direction are the same as in the original, while all lengths at right angles to the aforesaid direction (or in any other stated direction) are some multiple or submultiple of the corresponding lengths in the original. This multiple or submultiple may be the same for all lengths measured in the direction stated, or it may differ in different portions of the image. I do not restrict myself to any special type of reproduction, but I wish it to be clearly understood that by means of my process and apparatus I may prepare any reproduction whatever of a given image, on a scale which may be altered uniformly, or altered in different proportions for the several dimensions or parts of the original, or which may leave certain dimensions or parts unaltered, while changing other dimensions or parts uniformly or otherwise. My method may also be used to prepare copies in which the relation of right to left is reversed, as compared with the original, and this reversal may or may not be accompanied by a change in dimensions. Or the method may be so applied that the relation of right to left remains unchanged. My method may further be used to prepare copies unaltered in scale.

Broadly stated, the principle upon which my invention is based consists in submitting successively selected portions of the given original to a copying process, the copy being prepared upon successively selected portions of the vehicle or blank which after completion of the process bears the reproduction.

According to the manner of selecting successive portions of the original, and the corresponding successive portions of the blank, representations or reproductions variously related to the original are obtained. Furthermore, by in turn submitting the reproduction thus obtained to a process similar to that practised upon the original, a secondary reproduction may be obtained having a new relation to the original image. Similarly a tertiary copy, or copies of a higher order may be prepared, but certain secondary copies have properties which impart to them special utility, as will appear below.

In detail the mode of carrying out my process, and the apparatus employed therefor may vary within wide limits, while yet remaining within the scope of my invention.

As regards the successive selection of portions of the original for copying, it will in general be most convenient to select these in the form of very narrow strips, preferably bounded by parallel straight lines, although other elements may be used.

If the reproduction is to be prepared by a photographic process, the portions of the original thus successively selected may successively and in turn be rendered available for photographic copying by successively illuminating them in any suitable manner, for instance by casting a beam of light successively upon said selected portions. A simple way of effecting this, is to move the original across a narrow slit cut in an opaque partition, a source of light being situated on the other side of said partition. Obviously, if preferred, the original may be held stationary, and the slit may be moved.

The successive selection of successive portions of the blank, upon which portions the copies of successive portions of the original are made, may be practised in a manner analogous to that described above for the selection of successive portions of the original. In other words, while for example successive strip-shaped portions of the original are passing behind the slit, and being in turn exposed to the beam of light transmitted through the slit, the blank plate or film is simultaneously drawn past the slit, so that its successive striplike portions also are successively exposed to the beam of light passing through the slit and through the original. Evidently if the original and the blank just keep pace with one another, that is to say, travel at every instant with the same velocity and in the same direction the one as the other, a simple copy on unaltered scale is produced. If however the blank travels faster or more slowly than the original, both traveling in the same direction across the slit, then lines in the direction of motion will be lengthened or shortened respectively, on the copy as compared with the original, while lines at right angles to the line of motion will remain unaltered.

The particular arrangement of original, slit and blank, and their several motions, may be varied within wide limits without departing from the spirit of my invention. For the sake of example, and without in any way restricting the scope of my invention to these specific cases, a number of special arrangements which may be used are described below, reference being had to the accompanying drawing.

In this drawing Figs. 5 to 13 inclusive represent one preferred form of apparatus suitable for carrying out my process when the original is a photographic negative upon a glass plate, and in particular, Fig. 7ᵃ is a partial detail view showing the central portion of Fig. 7 with a slight modification hereinafter referred to.

Figure 1:
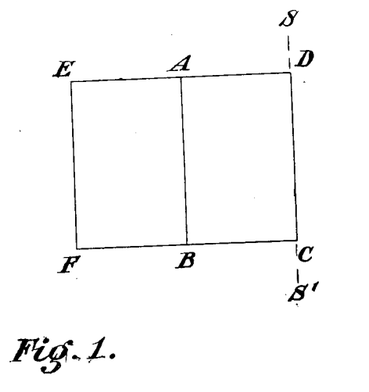
Figures 1, 2, 3, 4, are diagrammatic representations to illustrate a number of different arrangements of parts, and corresponding modes of carrying out my invention.

In the arrangement illustrated by Fig. 1 A B C D represents an original, such as a photographic negative, of which an enlargement is to be prepared. The negative is placed with its film side facing upward from the plane of the drawing. Over it is laid a sheet of thin but opaque material such as good opaque paper, preferably tinted red) having a very narrow straight slit, initially in the position indicated by S S' in the drawing. Over the paper, filmside down, is placed a sensitized blank E F C D, of the same width as the original, but of greater or less length. For the sake of example we will suppose that it has twice the length of the original. The initial position of E F C D is that indicated in the drawing.

Figure 2:
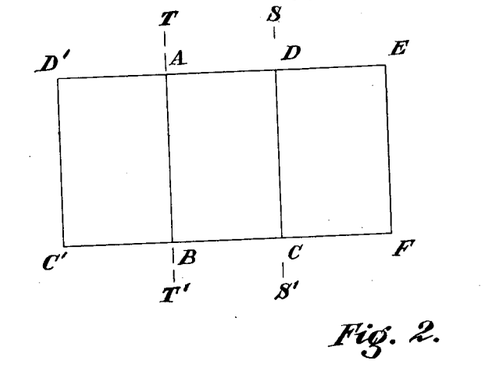
Figure 3:
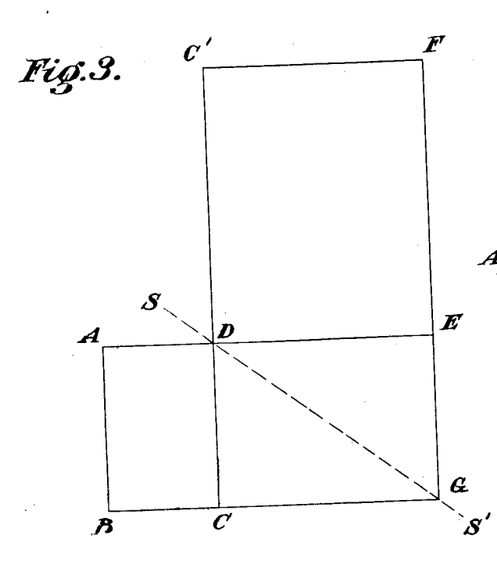

Light is admitted from the farther side of the original (the side corresponding to the back of the sheet of drawing) and the slit is now moved with preferably uniform velocity from right to left across the original, while at the same time the blank is moved from left to right with a velocity opposite in direction to that of the slit, and of such magnitude that the slit just traverses the entire length of this blank in the same time that it takes to traverse the length of the original. In the example selected above, where the blank is twice as long as the original, the velocity of the blank must be equal (and opposite) to that of the slit. Thus, while the slit successively exposes all parts of the original A B C D to the light, it also exposes all the corresponding parts of plate E F C D, so that on E F C D there appears a lengthened (positive) image of the original (negative). In the special example selected above the positive copy will be twice as long as the original while they both have the same breadth. However, by selecting different dimensions and corresponding velocities, I may prepare copies whose length bears different relations to that of the original. Thus the copy may for example be made shorter than the original. We may now submit the copy thus obtained (and preferably prepared in the form of a transparency) to a second operation similar to that practised on the original, but in such manner that the lengthening is now in a direction at right angles to that of the first lengthening. If for example in the first operation lines parallel to A B were lengthened, say doubled, in the second lines parallel to A B may be lengthened, say doubled. The result of this second operation will be an undistorted image of the original "enlarged" to four times the original scale, expressed in terms of area and will be a negative if the original was a negative. From this enlarged negative any number of positive prints may now be prepared by any suitable method. According to another arrangement, shown diagrammatically in Fig. 2, the initial position of the original is indicated by A B C D, the slit is initially at S S', the blank at E F C D. The slit is moved, preferably with uniform velocity, from the position S S' to the position T T', and at the same time the blank E F C D is moved from the position indicated to the position D' C' A B, while light is admitted as in the preceding example. If, as drawn in Fig. 2, the original and the blank are of the same dimensions, the result is a copy of the original, on an unaltered scale, but having the relation of right and left hand reversed, as compared with such a copy as would be obtained from the original by the common method of contact-printing. A third arrangement may be illustrated by Fig. 1, if we now suppose the slit to be lowermost, and stationary. Over it is the original A B C D, film-side up, and over this the blank E F C D. If now A B C D is moved from left to right through a distance equal to A D, and at the same time E F C D is moved through a distance equal to E D, also from left to right, then the result will be similar to that described in the first example above. Still another arrangement is illustrated in Fig. 3. The slit here is oblique as shown at S S' and may be stationary, while the original A B C D moves in the direction A D and the blank E F C' D moves in the direction C' D. The velocities may for example be so chosen that while A moves to E, F moves to G. The resulting image is a "sheared" copy of the original, i. e., one in which for example the right angle A B C of the original is represented by an acute angle in the copy. At the same time certain lines may be lengthened or shortened according to the dimensions and velocities chosen. In these examples for the sake of simplicity use has been made of a straight slit, and the velocities have been assumed rectilinear and preferably uniform. But I may use a slit of different shape, altering the motion accordingly and the velocities, instead of being uniform, may be variable, and directed in any desired sense, which itself may be made to vary from instant to instant. The slit is however preferably made very narrow, as this improves the definition, and of uniform width, as this ordinarily facilitates securing an even length of exposure for the different portions of the original treated. But for certain purposes a slit may be used which is variable in width from point to point or from instant to instant or both.

Figure 4:
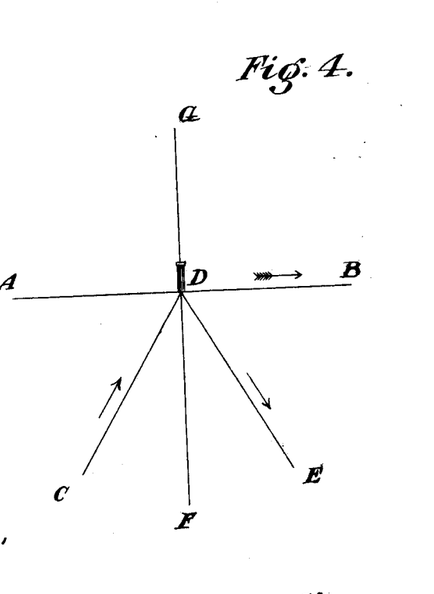

The method is not restricted to photographic printing processes, i. e. processes depending upon the action of light. For the sake of illustration Fig. 4 shows how a simple stencil may by my method be made to furnish an imprint differing in dimensions from the corresponding openings in the stencil. In this figure A B is the original, in this case a stencil, which may be moved at a suitable, preferably uniform speed in the direction A B, as indicated by the feathered arrow. C D E is a flexible blank, such as a sheet of paper; it makes contact with A B at D, being pressed against A B at D by means of some suitable edge or roller represented diagrammatically by F D. The blank C D E is moved with suitable velocity (greater than that of A B if a lengthened copy of the stencil is desired) past the edge or roller F D, as indicated by the unfeathered arrow. Suitable color or ink may be applied by means of a brush, roller or the like as indicated at G D.

Of course, if the direction of travel, either of the original A B, or of the blank C D E, is reversed, while the blank or original respectively travels in the direction indicated in Fig. 4, the result will be similar to that described with reference to Fig. 2, that is to say, the copy or reproduction will have the relation of right and left hand reversed, as compared with the original.

While I have here described my method as applied in particular to the use of a photographic printing process and to a simple stencil, I wish it to be clearly understood that I contemplate the use of any other means or mode of producing a record or imprint, such as for example the "catatype" printing process, and that my invention is not restricted to the particular examples set forth above for the sake of illustration.

Having thus set forth my process, I will now describe in detail apparatus which may be employed in carrying out the same.

Figures 5, 7, 7A, 11, 12, 13:
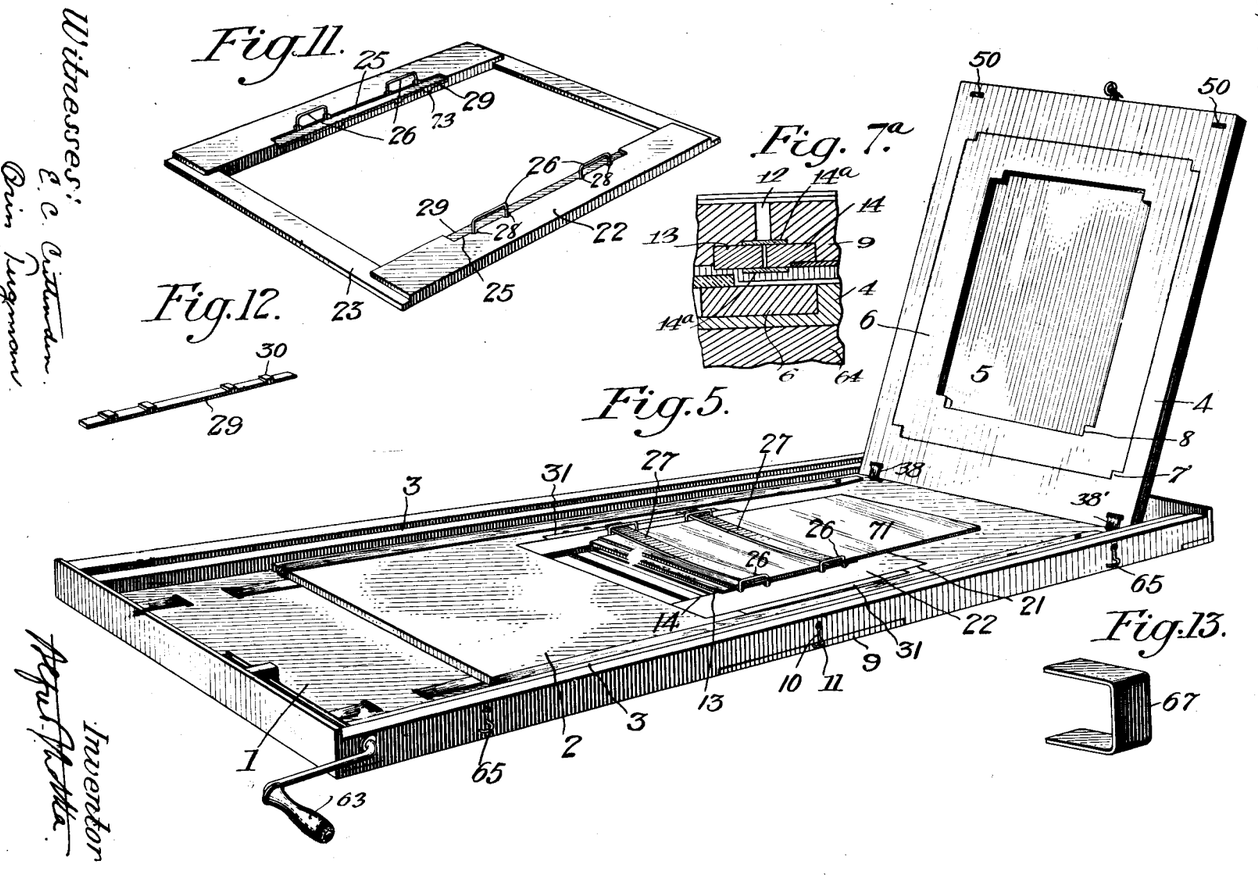
Fig. 5 is a perspective view, with certain parts removed, and others thrown open as in charging, to disclose certain essential parts.
Fig. 7 is a vertical section substantially along line VII—VII of Fig. 6, but showing an arrangement in which a single tape is employed at each side of the apparatus.
Fig. 11 is a perspective view of a removable adapter, which is inserted when the smaller size plate is to be used.
Figs. 12 and 13 are perspective views of certain details.

Referring to Fig. 5, 1 is a base, which in operation is preferably stationary. 2 is a board or plate adapted to slide longitudinally over base 1 and between the guides or side pieces 3, 3 rising from base 1 and firmly united thereto. 4 is a second board or plate, shorter than the first, but of the same breadth. In Fig. 5, 4 is shown thrown back, as in charging the apparatus; in operation 4 lies flat upon 2, over which it slides between the guides 3, 3, the said guides being of a depth equal to the combined thickness of 2 and 4. The plate 4 is provided with a recess 5 the depth of which must be at least somewhat in excess of the thickness of the photographic plates to be employed. Removably fitting into recess 5 is an adapter 6, which is inserted when the plates employed are smaller than those adapted for direct reception in recess 5. The corners of the recess are preferably formed with projections as shown at 7, and similarly the inner corners of 6 have projections 8. In operation the photographic plate extends through the entire length of the recess 5, or of that portion of 5 left open on insertion of adapter 6. The plate does not extend through the entire breadth of the recess 5, or the free portion thereof, but only as far as the inner edge of the corner pieces 7 or 8, which serve to loosely hold the plate in place. A little play is left both longitudinally and laterally, to allow for slight variations in the size of the plates upon the market. Owing to the arrangement of corner pieces 7 and 8 a space is left at the side of the plate, when inserted. This space receives loops 26, 26 and the ends of springs 27, 27 projecting upward from 2 as will be explained below. Base 1 is provided with a central opening into which fits a removable piece 9, held in place by any suitable device, such as hook 10 and pin 11.

Figures 6, 7:
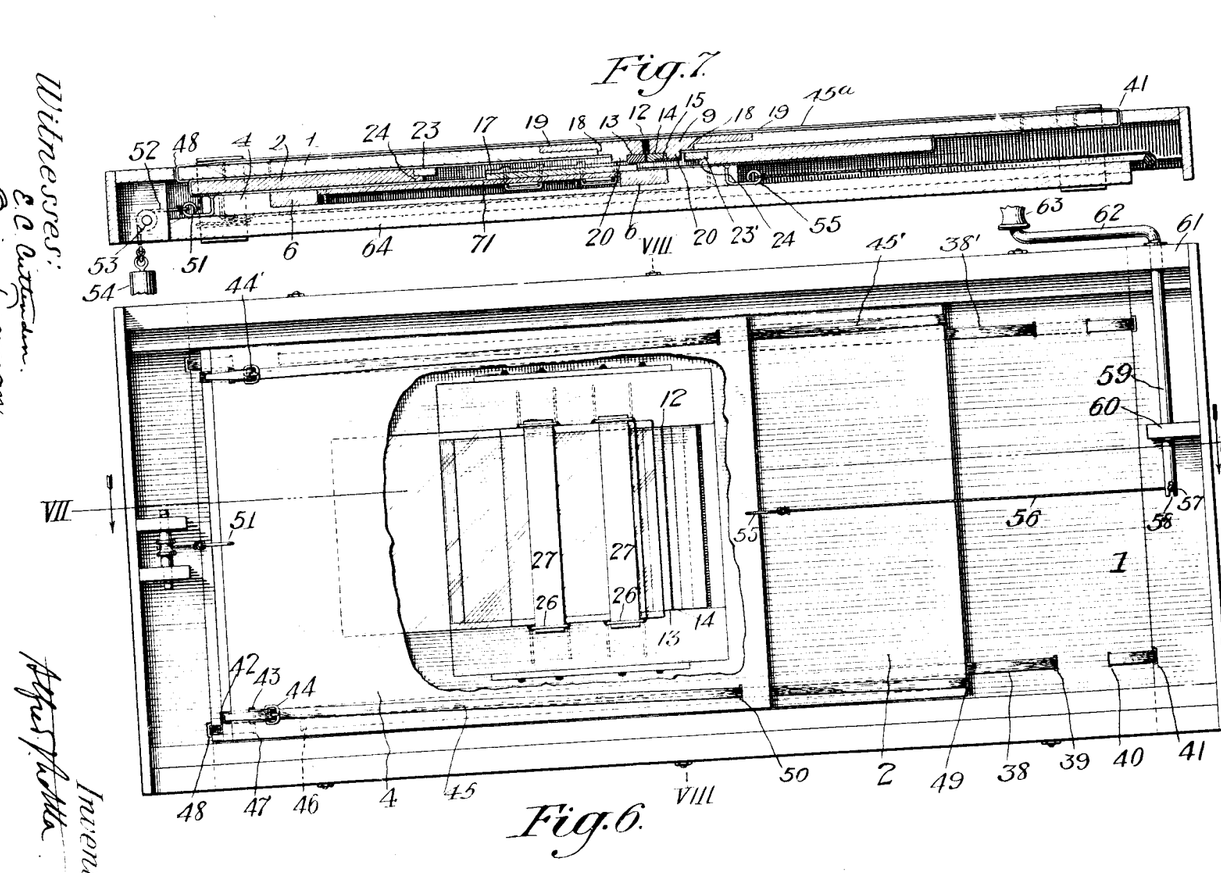
Fig. 6 is a plan, with certain parts broken away showing an arrangement in which two tapes are employed at each side of the apparatus.
Figure 8:
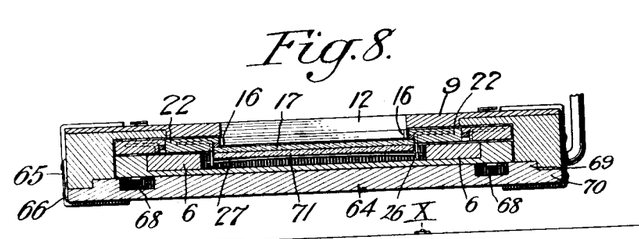
Fig. 8 is a vertical section along line VIII—VIII of Fig. 6, with certain parts shown in elevation.

By reference to Figs. 7 and 8 it will be seen that the removable piece 9 is provided centrally with an aperture or slit 12. From reasons of economy and to reduce the weight of the apparatus it is preferable not to make 9 of metal. The edges of the slit however which are effective in the operation of the instrument must be perfectly smooth and are preferably made of separate strips 13, 14, for example of brass, as shown in Figs. 5, 6, 7. Preferably at least one of these strips, for example 14, is made removable. For this purpose strip 14 is provided with a groove or rabbet over which fits a guide 15. When cover 9 is removed from base 1, the edge-piece 14 can simply be slid out, and the edges of 13 and 14 can then readily be cleaned or freed from adhering dust as the occasion may require. The proportions of the several parts are so chosen, that normally strips 13 and 14 are in absolute contact, their adjacent surfaces being ground true. By gently and slightly bending cover piece 9 with the hand, the contacting faces of 13 and 14 may be drawn slightly apart, and small pieces 16, 16 of very thin paper can then be inserted as shown in Fig. 8 at the extremities of the space between 13 and 14, thus forming delicate spacing means to produce a very fine slit between 13 and 14. The combined thickness of 9 and 13 or 14 is so adjusted that in operation the free surface of 13, 14 comes just up to, though preferably not quite contacting with, the free surface or back of the photographic plate. The slit is preferably covered with very thin glass, mica or the like, to keep out dust (see Fig. 7ª at 14ª). Cover piece 9 is made with shoulders 18, 18 and wings 19, 19, (Fig. 7) and with shoulders 20, 20 which serve to form a groove for the reception of edge-pieces 13, 14. The board 2 is provided with an opening 21, into which fits adapter 22, shown in detail in Fig. 11. Adapter 22 has shoulders 23, 23' to engage with corresponding shoulders 24 of board 2, as shown in section on Fig. 7. The sides of 22 are recessed at 25, 25, for the reception of a photographic plate, and are provided with eyes or loops 26 to engage springs 27, 27, as shown in Figs. 5, 6, 8. Notches 28 in 22 receive the vertical portions of loops 26, so that said portions are kept out of contact with the edges of the plate lodged in recesses 25, 25. Recesses 25, 25 may be partially filled up by thin laths 29, 29, shown in Fig. 11 and Fig. 12. As was mentioned above, the corner-pieces 8 leave spaces on either side, into which loops 26 project upward.

Loops 26 are removable, and as shown in Figs. 6, 7, 8 and 11 for example are made to slide in and out, laths 29 being removed when it is desired to withdraw loops 26. These loops pass through grooves 73 in recess 25, and laths 29 may be provided with cross-pieces 30 fitting into these grooves. This assists in keeping laths 29 in place.

Figures 9, 10:
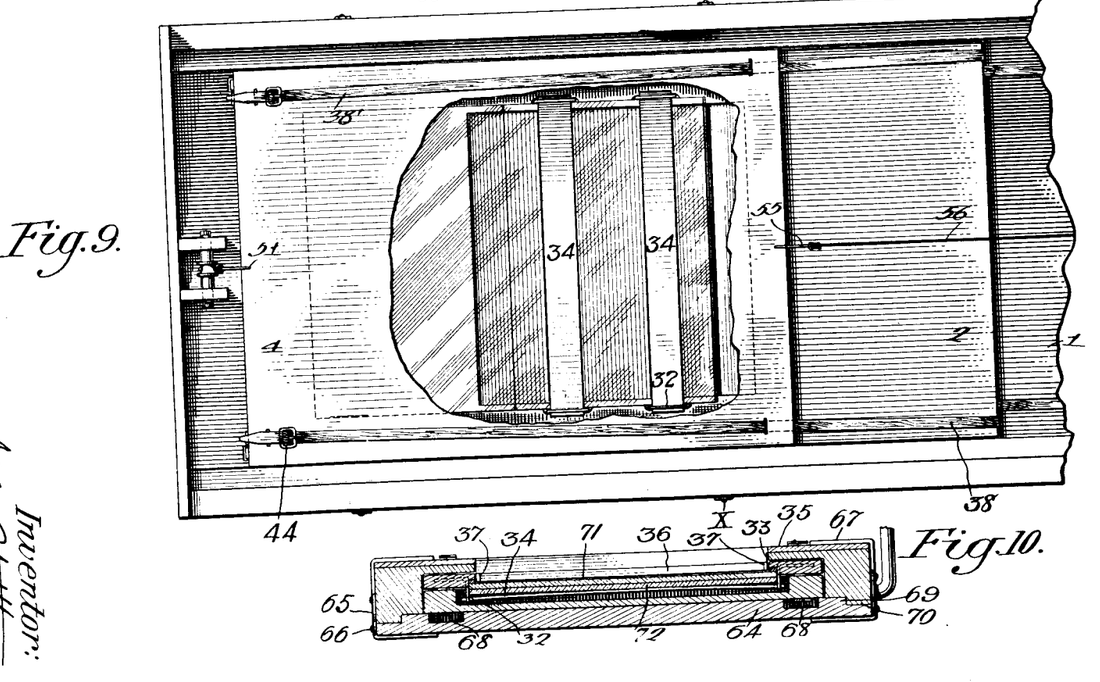
Fig. 9 is a plan view similar to Fig. 6, but with certain parts removed, and others inserted, so as to adapt the instrument for the reception of plates of a larger size, for a purpose which will be explained hereafter.
Fig. 10 is a vertical section along line X—X of Fig. 9.

The opening 21 of board 2 is provided with recesses 31, 31 (Fig. 5,) having loops 32 (Figs. 9 and 10) and laths 33, similar and corresponding to recesses 25, loops 26 and laths 29 of adapter 22, but designed to receive a larger plate and longer springs 34, 34 (Figs. 9, 10). When adapter 22 and loops 26 are in use, loops 32 are removed, and vice versa.

For use in conjunction with the larger size plate, a cover-piece 35, similar to 9 is provided, with edge-strips 36 and spacing pieces 37 (Fig. 10). This cover-piece is essentially similar to 9, except that the slit is longer, to correspond to the width of the larger plate, and does not require any further description.

The required type of motion is imparted, in the apparatus shown in Figs. 5 to 9, by a system of thin flexible tapes and a windlass. The tape 38 is attached to base 1 (Fig. 6), for example by passing it through the same several times as shown at 39, 40, 41, the friction at these openings, together with other features referred to hereafter, being sufficient to hold the tape in place. Tape 38 passes from 39 to the left over and in contact with the surface of base 1, and under board 2, emerging at 42, and is then passed through an opening 43 in 4, being firmly attached to 4 in any suitable manner. Tape 38 ends in a buckle 44. Tape 45 is attached to base 1 at 46, 47, 48, thence passes between 1 and 2, is flexed over 2 at 49, passes through 4 at 50, and may be fastened by means of the buckle at 44. The end of this tape is preferably made of leather. For the main portion of the tape I have found fine satin ribbon suitable. If desired the ends of the tapes at 41 and 48 may be fastened to 1 in any suitable manner, or a single tape 45ª may be used which extends under 1 from 41 to 48 as shown in Fig. 7, and from 48 to 41 as described above. In this case no special fastening is required at 41 and 48, the tape being held quite firmly by friction alone. On the opposite side of the apparatus similar tape or tapes (38' and 45', Fig. 6) are provided, which do not need separate description.

In certain of the appended claims, I have referred to the tapes as flexible connections each of which has its ends secured to different members, so that apparently these claims apply only to the construction shown in Fig. 6; I desire it to be understood, however, that the construction shown in Fig. 7, where both ends of the same tape or flexible connection are secured to the same member, is an absolute equivalent of the first-mentioned construction, and that accordingly the said claims are to be interpreted as covering both constructions.

The openings 39, 40, 41, 46, 47, 48 and the corresponding openings on the opposite side are not in exact alinement, but are so arranged that the tape is slightly oblique, so that its several adjacent portions come to lie side by side. Board 4 is provided at one end with a hook 51, (Figs. 6, 7 and 9). Fastened to hook 51 is a cord 52, which passes over a pulley 53, and supports a weight 54. At the opposite end board 4 is provided with a hook 55, to which is fastened a cord 56, tied in a knot at 57 to secure it in slot 58 at the end of axle 59. This latter is rotatably supported in bearings in blocks 60, 61, and carries at its outer end a crank 62 and handle 63. Closure is provided by means of a cover 64 (Figs. 7, 8, 10) which may be attached by any suitable means, such as hooks 65 and pins 66, or clamps 67, shown in detail in Fig. 13. If desired both hooks and eyes 65, 66 and clamps 67 may be used. Cover 64 is provided at 68, 68 with groves for the passage of tape 38 and buckle 44, and at 69 with a shoulder, to engage a shoulder 70 on guide 3.

The operation of the apparatus represented in Figs. 5 to 13 is as follows: Cover piece 9 carrying edge-strips 13, 14 is inserted in its place, and the apparatus is laid down facing as in Fig. 6. The cover 64 is removed, tapes 38 and 38' are unfastened at buckles 44, 44', and the backboard 4 is thrown upward and backward, as indicated in Fig. 5 tapes 38 and 38' acting as hinges. Adapter 22 is inserted into the board 2. For this purpose 2 may be thrown upward in the same way as 4. When 22 is in place, a negative 17 of which an enlarged copy is to be prepared, is laid, film side up, into the recess 25, loops 26 and laths 29 being in place. The depth of recess 25 (with laths 29 in place) is such that the film surface of the plate projects slightly over the surface of board 2 and adapter 22, the two latter being flush. The instrument is now taken into a "dark room" illuminated with red light in the usual manner. Over negative 17, which may for example measure 3¼x4¼ inches, is laid film downward a sensitive plate 71, of the same breadth as negative 17, but twice as long, that is to say, in the above example, measuring 6½x4¼ inches. Springs 27, 27 are then fitted under loops 26 as shown in Figs. 5 to 8, and adapter 6 is fitted into backboard 4, in which it may be held simply by friction. Tapes 38, 38' are now loosely passed through apertures 50, 50', and backboard 4 is laid down flat over board 2. Boards 4 and 2 are lightly moved forward or backward over base 1 until recess 5 is felt to register with plate 71, and backboard 4 sinks down into contact with board 2. The tapes 38, 38' are then drawn tight and fastened by means of buckles 44, 44'. Backboard 4 is then drawn into the position shown in Fig. 6, shoulder 20 acting as a stop engaging shoulder 23' of adapter 22 (Fig. 7) and cord 56 is attached at one end to hook 55, and slipped at the other end through notch 58 of axle 59, being held therein by knot 57. Cord 52 is similarly attached to hook 51 and is passed over pulley 53, in readiness for attaching weight 54 to it. Cover 64 is laid in place, and fastened by means of hooks 65 engaging pins 66, or by means of clamps 67, or in any other suitable manner. The instrument may now be taken out of the dark room, and exposure made by daylight, unless it is preferred to expose by artificial light. In practice it is found desirable to use fast plates and bright light. The instrument is now laid with the slit facing upward, weight 54 is attached, and light is allowed to fall upon negative 17 and plate 71 through slit 12, while handle 63 is turned at uniform speed. This causes backboard 4 to travel toward axle 59, while through the action of tapes 38, 38' board 2 is caused to travel in the same direction but at half the speed, on the well known principle of the single movable pulley. This motion is continued until shoulder 23 of adapter 22 engages the opposite shoulder 20 of cover piece 19. The dimensions of the several parts are such that before this motion of backboard 4 starts, and after it is completed, negative 17 and plate 71 are entirely withdrawn from under slit 12, as shown for example in Fig.

6. The instrument is now taken to the dark room and opened, and plate 71 is developed, fixed, washed and dried in the usual manner. In appearance it is a positive, and is a distorted copy of the negative, all lines parallel to the direction of cords 52, 56 being doubled in length, and lines at right angles to these being unchanged. This copy is now submitted to a process similar to that practised upon negative 17. It is unnecessary to describe this operation in detail, since it is essentially similar to that described above. It will suffice to indicate the steps which require modification. In this second operation adapter 22 is removed, and plate 71 is now laid into recess 31 of board 2, loops 26 having been taken out and transferred to position 32. The dimensions of recess 31 are such that when plate 71 is laid therein, it lies in a position at right angles to that occupied thereby during the first operation described above. A sensitive plate 72 (Fig. 10), of the same breadth as 71, but twice as long ($6\frac{1}{2} \times 8\frac{1}{4}$ inches in the example cited above) is laid over plate 71, and is fastened down by springs 34, 34. From this point on the operation is the same as in the first stage, except that the removal of adapter 22 with shoulders 23 allows somewhat more extended motion, corresponding to the larger size of the plates employed. After exposure plate 72 is taken out, developed, fixed, washed and dried. The result of this second operation is a negative, a copy of the original negative on twice the original scale, reckoned in linear measure.

While I have, for purposes of illustration, shown here a form of apparatus which produces undistorted copies on twice the original scale, I may, by introducing one or more additional intermediate boards, with tapes suitably arranged around them, construct apparatus similar in general principle to that shown in Figs. 5 to 13, but adapted to produce enlargements on four, eight or a greater number of times the original scale. It will be obvious that the shaft 59 may be operated in other ways than the one illustrated in the drawings.

For some purposes the distorted copy obtained by the first operation alone may also be of value, and my apparatus is adapted for the production of such distorted copies also.

Figure 14:
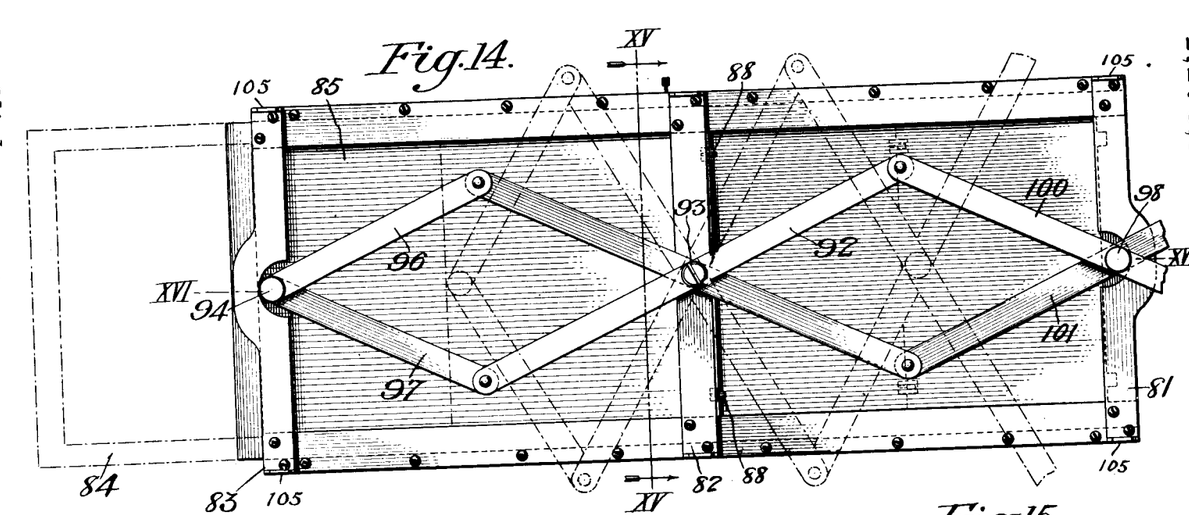
Fig. 14 is a plan view of another form of apparatus adapted for use with photographic dry plates.
Figures 15, 16, 17:
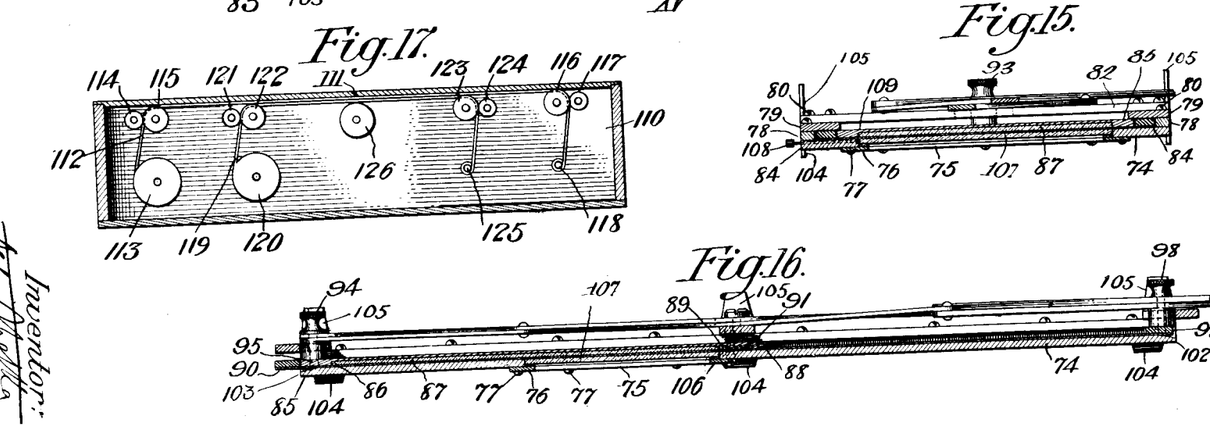
Fig. 15 is a section along line XV—XV of Fig. 14.
Fig. 16 is a section along line XVI—XVI of Fig. 14, with certain parts shown in elevation.
Fig. 17 is a diagrammatic representation in section of a form of apparatus adapted for carrying out my process with flexible photographic "films" carried upon a celluloid or similar vehicle.

Figs. 14 to 16 represent another form of apparauts for carrying out my process. As shown in the drawing, this apparatus comprises a base-plate 74 having a recessed opening 75, the recess being formed for example by a rectangular frame 76 attached to the base plate 74 by means of screws 77. At the sides of the base plate 74 may be arranged strips 78 and broader strips 79 laid over strips 78, these strips being fastened to base plate 74 by screws 80. Strengthening crosspieces 81, 82, 83 extend across from the strips on one side to those on the other, being screwed down upon them. Strips 79 are wider than strips 78, and overlap the same, so that grooves are formed between strips 79 and base plate 74. In these grooves slides a rectangular frame 84, the sides of which are narrower than the overlapping part of strips 79, so that the aforesaid grooves are not completely filled by frame 84. Fitting into the remaining portion of said grooves, and closely fitting within frame 84, is a plate or board 85 recessed at 86 (Figs. 15, 16), for the reception of a sensitized plate 87. Screws 88, 88, with milled heads pass through one end of plate 85, and the points of screws 88, 88 press against clamping pieces 89 within the recess 86, so that by turning screws 88 plate 87 may be firmly secured in recess 86. Across the frame 84, on its face adjacent to base-plate 74, is tightly spread a thin screen 90, which may for example be made of strong red paper. This screen should be opaque at least to those rays of light which readily affect the photographic plate. At 91 screen 90 is crossed by a narrow slit, seen in section in Fig. 16, and running parallel to the short side of the rectangular frame 84. A pair of lazy-tongs 92 is mounted upon a fixed pivot 93 attached to crosspiece 82. Loosely passing through one end of lazy-tongs 92 is a thumbscrew 94, which can be firmly screwed into plate 85 at 95. This thumbscrew serves at the same time to unite limbs 96, 97 of the lazy-tongs, so that when screw 94 is removed, limbs 96, 97 can be freely separated at their outer ends. Loosely passing through the opposite end of lazy-tongs 92 is a second thumbscrew 98, arranged similarly to screw 94, but screwed into frame 84 at 99. Limbs 100 and 101 of lazy-tongs 92 are extended beyond screw 98, and are formed into handles of convenient length (not shown). Base plate 74 is preferably beveled at 102, 103 (Fig. 16) to facilitate the introduction of frame 84 and prevent binding and jarring during motion, especially at the instant when the inner edge of the cross piece of 84 passes the edge of the base 74. Feet 104, 105 may be provided on each face of the body-frame, to enable it to be laid down flat without bringing any of the other projecting parts in contact with the supporting surface. Spacing strips 106 are placed in recess 86, to bring the original 107 of which a copy is to be made, and which is laid in this recess, flush with the inner face of base 74. This original may be clamped in place by means of a screw 108 extending through the side of body frame 73, and pressing with its point against a clamping corner-piece 109. To operate this instrument, thumbscrews 94, 98 are removed, and frame 84 and plate 85 are withdrawn so far as to expose recess 86. The requisite thickness of spacing strips 106 is inserted, and upon this, film side up, the negative or other original to be copied is laid. As stated above, this negative should be just flush with the inner face of base-plate 74. Plate 85 is taken out of the instrument, as can readily be done by drawing frame 84 out sufficiently, and a sensitized plate 87 is fastened down in recess 86 by means of screws 88 and clamps 89 (Fig. 16). This operation must of course be performed in a "dark room." The film side of this plate should be turned outward, and should be made just flush with the outer surface of plate 85. This is readily done by placing a piece of cardboard and several thicknesses of paper, as occasion may require, into recess 86, behind plate 87. Plate 85 thus charged is then introduced into the instrument as shown in Fig. 16, and thumbscrews 94, 98 are screwed in. The instrument is now placed with the opening 75 turned toward a source of light, and by working lazy-tongs 92 by opening out the handles (not shown), plate 85 containing sensitized plate 87 is caused to travel from left to right (referring to the arrangement of parts displayed in Figs. 14 and 16), while frame 84, and with it slit 91, travels from right to left, its final position being shown in dotted lines in Fig. 14. In the drawing the dimensions are chosen to represent an instrument which will receive a negative measuring 3¼x4¼ inches, and a sensitive plate measuring 4¼x6¼ inches; in such a case plate 87 moves 3¼ inches (or a little in excess of this) to the right, and slit 91 moves an equal distance to the left, the several limbs of lazy-tongs 92 being all of equal length. But different dimensions may be chosen, and the requisite motion, if unequal, of plate 87 and slit 91 may be obtained by suitably adjusting the length of the limbs of the lazy-tongs. In any case however the original and copy will have one dimension in common.

The development of plate 87 is effected as usual, and thus a distorted copy is obtained. From this a rectified copy can be obtained in a manner similar to that described in connection with the apparatus shown in Figs. 5 to 13. For this purpose a second separate apparatus similar to that shown in Figs. 14 to 16, but of correspondingly increased dimensions may be used, or, what is more expedient, one such apparatus with a set of adapters of suitable size may be employed for both the first and the second operation. This does not require any detailed description.

In Fig. 17 there is shown diagrammatically a form of apparatus suitable for carrying out my process with photographic films mounted upon a celluloid or similar flexible base. The apparatus consists of a closed box or chamber 110 in one wall of which is provided a narrow slit 111. The film 112 to be copied is wound up on a reel 113, and its end is passed between feed rollers 114, 115, made of yielding material, and pressed together by any suitable means. The free end of film 112 is taken in close proximity past the slit 111 and between feed rollers 116, 117, and attached to the winding reel 118. A sensitized film 119 is similarly unwound from a reel 120 through feed rollers 121, 122 and 123, 124, and wound on a reel 125, film 112 facing with its celluloid side outward toward the slit, and film 119 facing with its sensitive emulsion side in contact with the emulsion side of film 112. To insure proper contact a yielding roller 126 is preferably provided. To operate this apparatus the feed rollers are rotated by any suitable means each at a definite speed. If the speed of the two films is the same a simple unaltered copy is obtained. This may be taken advantage of in copying for example cinematograph films. If however film 119 moves faster than film 112, a drawnout copy is obtained, or if 119 moves more slowly than 112 a foreshortened copy is obtained, i. e. one in which lines parallel to the slit are copied unaltered, but lines at right angles to the same are shortened. It is of course necessary, in case the films employed are narrower than the breadth of the slit, to cover up the free portions of the slit.

The drawn out copy obtained as described above may be subjected to a second operation resembling the above, but so performed that the second lengthening is at right angles to the first. For this purpose, the film is wound on the reel 113 in a position at right angles to that which it occupied during the first operation. That is to say, the edge of the film which previously was arranged parallel to the axis of the reel, is now coiled transversely upon the reel, and vice versa. In a number of cases, the reel will be long enough to accommodate the film in either position; when such is not the case, simple expedients, such as will occur to any skilled mechanic, will be adopted to enable the film to be wound on the reel in the desired manner. The result of the second operation is an undistorted copy, on enlarged scale, of the original. If the original was a negative, this copy will be a negative, and any number of prints can be prepared therefrom by any of the known methods. Similarly from the foreshortened copy, copies on a reduced scale may be obtained.

Having thus set forth the nature of my invention, I wish it to be clearly understood that I do not limit myself to the details of process and apparatus herein described by the way of example, but that I claim as my invention the broad plan and principles of which such examples are illustrations, and which are more specifically pointed out in the following claims.

What I claim is:

1. In a device for preparing reproductions or images of objects, three members movable relatively to one another, a flexible connection attached at one end to one of said members and at the other end to another of said members, said connection forming a bight in which one end of the third member engages, and a second flexible connection attached at one end to said first member and at the other end to said second member, and forming a bight for engaging the other end of said third member.

2. Apparatus for producing records, comprising a base provided with an aperture, means movable in a predetermined path over said base, and adapted to hold in immediate proximity to said aperture an original adapted to produce a record by coöperation with an agent admitted through said aperture, means for holding a blank adapted to retain a record in contact with said original, means movable in predetermined path over said first mentioned movable means, means on said second movable means, adapted to engage said blank and cause it to move together with said second movable means, means for propelling said second movable means, means whereby motion of said second movable means causes motion of the first movable means of a character related in a predetermined way to the motion of the second movable means, and tensioning means adapted to oppose the motion of the aforementioned second movable means, thereby placing it under tension.

3. In a device for preparing reproductions or images of objects, three members movable relatively to one another, flexible connections extending in opposite directions from one of said members and having bight-forming return portions likewise extending in opposite directions, one end of each of said connections being attached to another of said members, and the other end to the said first member, while the bights of the two flexible connections engage oppositely facing surfaces of the third member.

4. In a device for preparing reproductions or images of objects, three members movable relatively to one another, a pair of flexible connections extending in opposite directions from one of said members at one side of its longitudinal center, another pair of flexible connections extending from the same member in a like manner at the other side of its longitudinal center, each of said flexible connections having a bight-forming return portion, one end of each of said connections being attached to another of said members, and the other end to the first-named member, while the bights of the two flexible connections engage opposite ends of the third member.

5. A method of preparing reproductions of a given image, by first producing a copy distorted in some definite predetermined manner, and thereupon producing a secondary copy from the first-mentioned copy, said secondary copy itself being distorted in some definite predetermined manner with regard to the first copy.

6. A method of preparing a reproduction on an altered scale of a given image, which consists in producing a distorted copy of said image, and then producing from said copy a secondary copy so distorted with regard to the first, as to compensate for the distortion of the first, and produce a secondary copy geometrically similar to the original.

7. A method of preparing an enlarged copy of a given image, by first producing from said image a copy distorted by increasing the length of all lines running in a certain direction, and then producing from said copy a secondary copy so distorted with respect to the first as to compensate for the distortion of the first, and produce a secondary copy geometrically similar to the original.

8. A method of preparing a reproduction on an altered scale of a given image, by first producing a copy of said image having all lines parallel to a predetermined direction altered in a given ratio, and lines at right angles to this direction unaltered, and thereupon producing a secondary copy from the first-mentioned copy, said secondary copy having the lines previously unchanged altered in the aforementioned ratio, and lines at right angles to said direction left unaltered as compared with the primary copy.

9. An apparatus for making records, comprising three members, one of which is provided with an aperture, while the second forms a holder for the original and the third a holder for a record-retaining blank, the said three members being arranged with their broad surfaces facing each other in the neighborhood of said aperture and two of them being constructed as slides movable in parallel paths having a component transverse to the direction of said aperture to establish successively the operative relation of different portions of the original and of the record-retaining blank with said aperture.

10. An apparatus for making records, comprising three members, one of which is provided with an aperture, while the second forms a holder for the original and the third a holder for a record-retaining blank, the said three members being arranged with their broad surfaces facing each other in the neighborhood of said aperture and two of them being constructed as slides movable in parallel paths having a component transverse to the direction of said aperture while the third member is stationary, the movement of the slides being adapted to establish successively the operative relation of different portions of the original and of the record-retaining blank with said aperture.

11. An apparatus for making records, comprising three members, one of which is provided with an aperture, while the second forms a holder for the original and the third a holder for a record-retaining blank, the said three members being arranged with their broad surfaces facing each other in the neighborhood of said aperture and two of them being constructed as slides movable in parallel paths having a component transverse to the direction of said aperture, and an operative connection between said two slides to cause them to move in different ways so as to constantly alter the relative position of original and record-retaining blank.

12. An apparatus for making records, comprising three members, one of which is provided with an aperture, while the second forms a holder for the original and the third a holder for a record-retaining blank, the said three members being arranged with their broad surfaces facing each other in the neighborhood of said aperture and two of them being constructed as slides movable in parallel paths having a component transverse to the direction of said aperture, and a flexible operative connection consisting of tapes associated with said slides and arranged to cause them to move in different ways so as to constantly alter the relative position of original and record-retaining blank.

13. An apparatus for making records, comprising three members, one of which is provided with an aperture, while the second forms a holder for the original and the third a holder for a record-retaining blank, the said three members being arranged with their broad surfaces facing each other in the neighborhood of said aperture and two of them being constructed as slides movable in parallel paths having a component transverse to the direction of said aperture, and an operative connection consisting of tapes secured to one of said slides and to the third member and embracing the other slide and having a sliding engagement therewith to cause the last-named slide to move at a different rate of speed from the other slide.

14. A method of preparing reproductions on an altered scale of a given image, by first producing a copy distorted in a definite direction, and thereupon producing a secondary copy from the first-mentioned copy, said secondary copy itself being distorted with regard to the first copy in a direction having a component transverse to the first-named direction.

15. A method of producing an altered reproduction of a given image, by first producing a copy of said image having all lines parallel to a predetermined direction altered as to length, and lines at right angles to this direction unaltered, and thereupon producing a secondary copy from the first-mentioned copy, said secondary copy having those lines unaltered which are at a predetermined angle to said right-angle lines, and all other lines altered as to length.

16. A method of producing an altered reproduction of a given original, which consists in moving a blank adapted to retain a record, in a predetermined direction past the surface of the given original, and during such motion causing a record-producing agent to be transmitted through successive strip-shaped portions of the original to successive strip-shaped portions of the blank, and then subjecting the copy thus obtained to a copying process similar to the first copying process but proceeding in a direction having a component transverse to the first-named direction.

17. The method of preparing inverted copies of images which consists in copying progressively the image upon the image-receiving blank by relatively reversely moving the image and the blank through a beam of light having a minimum dimension in the direction of such movement and formed by parallel rays of light.

18. The method of preparing inverted copies of objects or images pervious to light, which consists in copying progressively the object or image upon the image-receiving blank by relatively reversely moving the object or image and the blank through a beam formed by parallel rays of light passing through said object or image and having a minimum dimension in the direction of such movement.

19. The method of preparing inverted copies of objects or images pervious to the copying agent, which consists in copying progressively the object or image upon the image-receiving blank by relatively reversely moving the object or image and the blank through a stream or beam of the copying agent passing in a uniform direction through said object or image and having a minimum dimension in the direction of such movement.

20. In a device of the character described, a member provided with a portion for allowing the passage of a copying agent, another member movable relatively to said first-named member and provided with means for successively holding adjacent to said portion, an original and a primary copy made therefrom and of a different size, and means for holding a blank sensitive to the copying agent, in operative relation to said two members.

21. In a device of the character described, a member provided with a portion for allowing the passage of a copying agent, another member movable relatively to said first-named member and provided with means for holding adjacent to said portion, articles of two different sizes, said sizes having one dimension in common, and means for holding a blank sensitive to the copying agent, in operative relation to said two members.

In testimony whereof, I have signed my name to this specification in the presence of two subscribing witnesses.

ALFRED J. LOTKA.

Witnesses:
ORIN TUGMAN,
E. C. CRITTENDEN.